US011405524B2

(12) United States Patent
Aizono

(10) Patent No.: US 11,405,524 B2
(45) Date of Patent: Aug. 2, 2022

(54) IMAGE FORMING APPARATUS, METHOD OF CONTROL, AND PROGRAM PRODUCT FOR PRINTING AN IMAGE ON A SHEET BASED ON A SETTING AND COUNTING A NUMBER OF SHEETS ON WHICH SCANNED IMAGES DETERMINED TO BE CHROMATIC OR ACHROMATIC ARE PRINTED

(71) Applicant: CANON KABUSHIKI KAISHA, Tokyo (JP)

(72) Inventor: Keisuke Aizono, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/829,681

(22) Filed: Mar. 25, 2020

(65) Prior Publication Data
US 2020/0314286 A1 Oct. 1, 2020

(30) Foreign Application Priority Data

Mar. 29, 2019 (JP) .............................. JP2019-068837
Oct. 18, 2019 (JP) .............................. JP2019-191578

(51) Int. Cl.
*H04N 1/40* (2006.01)
*H04N 1/00* (2006.01)
(Continued)

(52) U.S. Cl.
CPC ....... *H04N 1/40012* (2013.01); *G06T 11/001* (2013.01); *H04N 1/00644* (2013.01);
(Continued)

(58) Field of Classification Search
CPC .......... H04N 1/00644; H04N 1/00832; H04N 1/344; H04N 1/346; H04N 1/40012;
(Continued)

(56) References Cited

U.S. PATENT DOCUMENTS

| 6,029,023 A * | 2/2000 | Munemori | G03G 15/01 |
| | | | 399/299 |
| 6,504,628 B1 * | 1/2003 | Kanno | H04N 1/46 |
| | | | 358/515 |
| 7,667,861 B2 * | 2/2010 | Umetani | G03G 15/50 |
| | | | 358/1.12 |
| 8,159,718 B2 * | 4/2012 | Misawa | H04N 1/56 |
| | | | 358/2.1 |

(Continued)

FOREIGN PATENT DOCUMENTS

| JP | 2007-13724 A | 1/2007 |
| JP | 2009-141807 A | 6/2009 |

*Primary Examiner* — Scott A Rogers
(74) *Attorney, Agent, or Firm* — Canon U.S.A., Inc. IP Division

(57) ABSTRACT

An apparatus includes a specifying unit that specifies a color; an input unit that inputs an image; a converting unit that converts a color in the image, which has a hue within a predetermined range with respect to the specified color, into a color of a predetermined hue and converts a color in the image, which has a hue outside the predetermined range with respect to the color, into black; a printing unit that prints the image subjected to the converted color; and a counting unit that separately counts a number of sheets when the printed image includes the color of the predetermined hue and a number of sheets when the printed image does not include the color of the predetermined hue.

18 Claims, 13 Drawing Sheets

(51) Int. Cl.
*H04N 1/50* (2006.01)
*H04N 1/23* (2006.01)
*G06T 11/00* (2006.01)
*H04N 1/34* (2006.01)

(52) U.S. Cl.
CPC ....... *H04N 1/00832* (2013.01); *H04N 1/2338* (2013.01); *H04N 1/2369* (2013.01); *H04N 1/344* (2013.01); *H04N 1/50* (2013.01)

(58) Field of Classification Search
CPC ............ H04N 1/465; H04N 1/50; H04N 1/56; H04N 1/60; H04N 1/2338; H04N 1/2369
See application file for complete search history.

(56) References Cited

U.S. PATENT DOCUMENTS

| | | | | |
|---|---|---|---|---|
| 8,384,962 | B2* | 2/2013 | Sugiyama | ........... H04N 1/40012 |
| | | | | 358/3.24 |
| 8,477,324 | B2* | 7/2013 | Miyagi | .................... H04N 1/56 |
| | | | | 358/1.13 |
| 9,310,739 | B2* | 4/2016 | Horiyama | ............... G03G 15/50 |
| 9,819,827 | B2* | 11/2017 | Tagaki | ............... G06Q 30/0225 |
| 10,599,899 | B2* | 3/2020 | Sun | ....................... G06Q 20/145 |
| 2007/0002346 | A1* | 1/2007 | Nakane | .................... H04N 1/56 |
| | | | | 358/1.9 |
| 2008/0174792 | A1* | 7/2008 | Nishi | ................ H04N 1/00347 |
| | | | | 358/1.6 |
| 2008/0304091 | A1* | 12/2008 | Kobashigawa | ....... G06F 3/1219 |
| | | | | 358/1.13 |

* cited by examiner

FIG. 2A 200 — Home: Copy (201), Special-red copy (202)

FIG. 2B 210 — Copy 211
- Automatic (color-monochrome) | 100% | Cassette 1 A4 | 1
- Color selection (212) | Magnification (213) | Sheet selection (214)
- Finishing (215) | Duplex printing (216) | Density (217)

FIG. 2C 220 — Special-red copy
- Automatic (special red) | 100% | Cassette 1 A4 | 1
- Color selection | Magnification | Sheet selection
- Finishing | Duplex printing | Density

FIG. 2D 230 — <Color selection>
- Automatic (color-monochrome) (231) | Full-color (232) | Monochrome (233)
- Single-color (234) | Two-color (235) | Automatic (special red) (236)
- Cancel (237) | OK (238)

FIG. 2E 240 — <Single-color>
- Red (241) | Green (242) | Blue (243)
- Yellow (244) | Magenta (245) | Cyan (246)
- Cancel (247) | OK (248)

FIG. 2F 250 — <Two-color>
- Red (251) | Green (252) | Blue (253)
- Yellow (254) | Magenta (255) | Cyan (256)
- Cancel (257) | OK (258)

FIG. 7

| 700 | | 703 FULL-COLOR | 704 FULL-COLOR | 705 MONOCHROME | 706 MONOCHROME | 707 SINGLE-COLOR | 708 SINGLE-COLOR |
|---|---|---|---|---|---|---|---|
| 701 | 702 | LARGE | SMALL | LARGE | SMALL | LARGE | SMALL |
| 101 | TOTAL 1 | 1 | 1 | 1 | 1 | 1 | 1 |
| 102 | TOTAL 2 | 2 | 1 | 2 | 1 | 2 | 1 |
| 103 | FULL-COLOR 1 | 1 | 1 | 0 | 0 | 0 | 0 |
| 104 | FULL-COLOR 2 | 2 | 1 | 0 | 0 | 0 | 0 |
| 105 | MONOCHROME 1 | 0 | 0 | 1 | 1 | 0 | 0 |
| 106 | MONOCHROME 2 | 0 | 0 | 2 | 0 | 0 | 0 |
| 107 | SINGLE-COLOR 1 | 0 | 0 | 0 | 0 | 1 | 1 |
| 108 | SINGLE-COLOR 2 | 0 | 0 | 0 | 0 | 2 | 1 |

FIG. 12

| 1201 | 1202 | 1203 FULL-COLOR LARGE | 1204 FULL-COLOR SMALL | 1205 MONOCHROME LARGE | 1206 MONOCHROME SMALL | 1207 SINGLE-COLOR LARGE | 1208 SINGLE-COLOR SMALL | 1209 TWO-COLOR LARGE | 1210 TWO-COLOR SMALL |
|---|---|---|---|---|---|---|---|---|---|
| 101 | TOTAL 1 | 1 | 1 | 1 | 1 | 1 | 1 | 1 | 1 |
| 102 | TOTAL 2 | 2 | 1 | 2 | 1 | 2 | 1 | 2 | 1 |
| 103 | FULL-COLOR 1 | 1 | 1 | 0 | 0 | 0 | 0 | 0 | 0 |
| 104 | FULL-COLOR 2 | 2 | 1 | 0 | 0 | 0 | 0 | 0 | 0 |
| 105 | MONOCHROME 1 | 0 | 0 | 1 | 1 | 0 | 0 | 0 | 0 |
| 106 | MONOCHROME 2 | 0 | 0 | 2 | 1 | 0 | 0 | 0 | 0 |
| 107 | SINGLE-COLOR 1 | 0 | 0 | 0 | 0 | 1 | 1 | 0 | 0 |
| 108 | SINGLE-COLOR 2 | 0 | 0 | 0 | 0 | 2 | 1 | 0 | 0 |
| 109 | TWO-COLOR 1 | 0 | 0 | 0 | 0 | 0 | 0 | 1 | 1 |
| 110 | TWO-COLOR 2 | 0 | 0 | 0 | 0 | 0 | 0 | 2 | 1 |

IMAGE FORMING APPARATUS, METHOD OF CONTROL, AND PROGRAM PRODUCT FOR PRINTING AN IMAGE ON A SHEET BASED ON A SETTING AND COUNTING A NUMBER OF SHEETS ON WHICH SCANNED IMAGES DETERMINED TO BE CHROMATIC OR ACHROMATIC ARE PRINTED

BACKGROUND OF THE INVENTION

Field of the Invention

The aspect of the embodiments relates to an image forming apparatus, a method of controlling the image forming apparatus, and a storage medium.

Description of the Related Art

An image forming apparatus has hitherto been disclosed, which determines whether an image of each page includes only achromatic colors or includes chromatic colors, performs counting for monochrome printing if it is determined that an image of each page includes only achromatic colors, and performs counting for color printing if it is determined that an image of each page includes chromatic colors (Japanese Patent Laid-Open No. 2009-141807).

In addition, a printing method using two colors in an image forming apparatus is proposed. In the printing using two colors, colors close to a specified color in an image are converted into the specified color and colors that are not close to the specified color in the image are printed in black in response to an instruction to perform the printing using two colors from a user (Japanese Patent Laid-Open No. 2007-13724).

The user often basically uses two colors for a color image in the instruction to perform the printing using two colors. Accordingly, it is not necessary to switch the counting based on whether a color image is to be printed in the printing using two colors in related art.

However, when switching between the counting for monochrome printing and the counting for color printing is not performed, the user may not be capable of accurately performing the counting depending on the image to be printed using two colors. For example, the counting for color printing is performed despite the fact that almost all multiple images to be printed using two colors by the user are composed of colors that are not close to a specified color and are printed in black.

Although the image forming apparatus in Japanese Patent Laid-Open No. 2009-141807 determines whether an image of each page includes only achromatic colors or includes chromatic colors in printing of a full-color image to switch a counter based on the result of the determination, an operation in the two-color printing is not described in Japanese Patent Laid-Open No. 2009-141807.

In the image forming apparatus in Japanese Patent Laid-Open No. 2007-13724, colors close to a specified color in an image are converted into the specified color and colors that are not close to the specified color in the image are converted into black for printing in response to an instruction to perform the two-color printing. However, determination of whether each color in an image of each page is close to the specified color in the two-color printing and switching of the counter based on the result of the determination are not described in Japanese Patent Laid-Open No. 2007-13724.

SUMMARY OF THE INVENTION

The aspect of the embodiments provides an apparatus including a specifying unit that specifies a color; an input unit that inputs an image; a converting unit that converts a color in the input image, which has a hue within a predetermined range with respect to the specified color, into a color of a predetermined hue and converts a color in the input image, which has a hue outside the predetermined range with respect to the color, into black; a printing unit that prints the image subjected to the converted color; and a counting unit that separately counts a number of sheets when the printed image includes the color of the predetermined hue and a number of sheets when the printed image does not include the color of the predetermined hue.

Further features of the disclosure will become apparent from the following description of exemplary embodiments with reference to the attached drawings.

BRIEF DESCRIPTION OF THE DRAWINGS

FIG. 2A to FIG. 2F illustrate examples of screens for performing a copy function, which are displayed in an operation unit.

FIG. 7 illustrates an example of a counter calculation table.

FIG. 12 illustrates an example of a counter calculation table.

DESCRIPTION OF THE EMBODIMENTS

Figure 1:
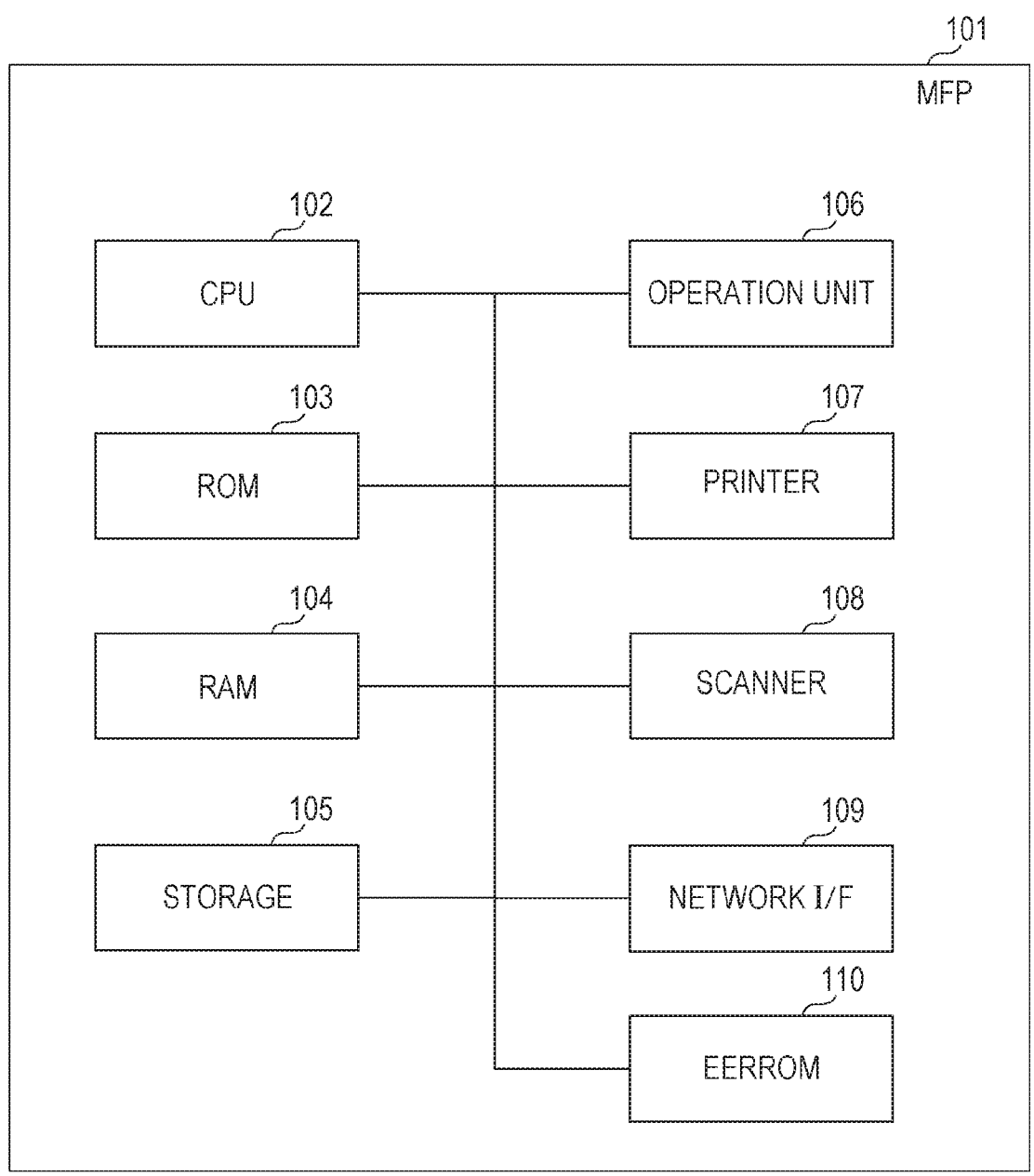
FIG. 1 illustrates an example of the hardware configuration of an MFP.

Embodiments of the disclosure will herein be described with reference to the drawings. The configurations described in the following embodiments are only examples and the disclosure is not limited to the configurations illustrated in the drawings.

First Embodiment

In a first embodiment, a case will be described in which the count value of a full-color number-of-sheets counter or a single-color number-of-sheets counter is counted up (counted) in two-color printing.

FIG. 1 illustrates an example of the hardware configuration of a multi-function peripheral (MFP) 101. The MFP 101, which is an example of an image forming apparatus, includes the following components. For example, the MFP 101 includes a central processing unit (CPU) 102, a read only memory (ROM) 103, a random access memory (RAM) 104, a storage 105, an operation unit 106, a printer 107, a scanner 108, a network interface (I/F) 109, and an electrically erasable and programmable read only memory (EEPROM) 110.

The CPU 102 controls the various hardware components 102 to 110 composing the MFP 101 to realize the respective functions of the MFP 101. The CPU 102 transmits signals to the various hardware components through a bus line to realize mutual data communication with the other hardware components.

In addition, the CPU 102 in the MFP 101 controls the operation of the MFP 101 in accordance with a control program stored in the ROM 103. More specifically, the CPU 102 executes an operating system (OS) that controls the MFP 101 and driver programs for controlling the hardware components. Application programs and the likes on the OS mutually operate to perform and control a function desired by a user. The OS and the various programs are stored in the ROM 103 and read out in the RAM 104 for execution.

The ROM 103 is a memory for storing programs and a variety of data used by the CPU 102. The RAM 104 is a working memory for temporarily storing programs and data used by the CPU 102 for arithmetic operation. The storage 105 is a storage unit that stores a variety of data, various programs, and so on.

Although a hard disk drive (HDD) is supposed as the storage 105 in the first embodiment, an auxiliary storage device, such as a solid state drive (SSD), a flash memory, or an embedded MultiMediaCard (eMMC), may be used as the storage 105. Although one CPU 102 performs the respective processes illustrated in the following flowcharts using one memory (the RAM 104) in the MFP 101, another mode may be used. For example, multiple CPUs, multiple RAMs, multiple ROMs, and multiple storages may perform the respective processes illustrated in the following flowcharts in cooperation with each other. Alternatively, part of the processes may be performed using a hardware circuit, such as an application specific integrated circuit (ASIC) or a field programmable gate array (FPGA).

The operation unit 106 is a user interface, such as a touch panel, which is used by the user to operate the MFP 101 and accepts an operation or an input by the user. The operation unit 106 may be used as a display unit that displays, for example, a screen used to operate the MFP 101.

The printer 107 is a unit that realizes a print function. The printer 107 prints an image on a sheet by executing a print job received from a personal computer (PC) under the control of the CPU 102. The print job is data including an instruction to cause the MFP 101 to perform a printing process, image data, print settings information, and so on. The printer 107 is capable of performing a copy function to print an image scanned by the scanner 108 on a sheet under the control of the CPU 102.

The scanner 108 is a unit that realizes a scanning function. The scanner 108 optically reads out an image of an original document under the control of the CPU 102 to generate the image data.

The network I/F 109 performs wired local area network (LAN) communication, such as Ethernet. The network I/F 109 may be a network interface for wireless LAN communication, a universal serial bus (USB)-LAN interface, or the like.

The EEPROM 110 is a non-volatile memory and stores setting values and so on to execute the control program. Number-of-sheets counters described below are also stored in the EEPROM 110.

FIG. 2A to FIG. 2F illustrate examples of screens for performing the copy function, which are displayed in the operation unit 106. FIG. 2A illustrates an example of a home screen. A Home screen 200 is displayed in the operation unit 106 and buttons for performing and setting the copy function, a special-red copy function, the scanning function (not illustrated), and so on are capable of being selected on the Home screen 200.

Although a Copy icon 201 and a Special-red copy icon 202 are displayed on the Home screen 200 in the first embodiment, the first embodiment is not limited to this. Icons of the scanning function, a transmission function, and so on, which are provided by the MFP 101, may be displayed on the Home screen 200. The Copy icon 201 is used to start the general copy function. The CPU 102 displays a Copy settings screen 210 illustrated in FIG. 2B upon detection of selection of the Copy icon 201 with the operation unit 106. The Special-red copy icon 202 is used to start the copy function of a document including red and black. The CPU 102 displays a Special-red copy settings screen 220 illustrated in FIG. 2C in the operation unit 106 upon detection of selection of the Special-red copy icon 202 with the operation unit 106. Although an example is described in the first embodiment, in which a color original document is output in two colors: a predetermined red (hereinafter referred to as special red) and black, the first embodiment is not limited to this. For example, the color original document may be output in arbitrary two colors set by the user.

FIG. 2B illustrates an example of the copy settings screen. The Copy settings screen 210 is composed of settings display 211, a Color selection button 212, a Magnification button 213, a Sheet selection button 214, a Finishing button 215, a Duplex printing button 216, and a Density button 217.

The content currently set for the copy function is displayed in the settings display 211. The settings of a color mode, a magnification, a sheet feed cassette, and the number of copies are sequentially displayed from the left in the settings display 211.

The Color selection button 212 is used to display a Color selection screen 230 for selecting the color mode of a print upon selection by the user.

The Magnification button 213 is used to set the magnification of the print based on the original document upon selection by the user. The Sheet selection button 214 is used to set the cassette from which sheets for printing are fed upon selection by the user.

The Finishing button 215 is used to set postprocessing, such as stapling or punching, for the print upon selection by the user. The Duplex printing button 216 is used to select duplex printing or single-sided printing for the print upon selection by the user. The Density button 217 is used to set the density when an image is printed on a sheet upon selection by the user.

Numerical values may be input or options may be displayed within a range capable of being provided in the MFP 101 on the detailed settings screens for the buttons 213 to 217. Other settings buttons may be provided on the Copy settings screen 210. Upon detection of selection of a Start button (not illustrated) of a hard key or a soft key by the CPU 102 in a state in which the Copy settings screen 210 is displayed in the operation unit 106, a copying process is started based on the displayed settings. Specific flows of the copying process will be described below with reference to FIG. 5 and FIG. 6. Buttons which are similar to the buttons 212 to 217 are displayed on the Special-red copy settings screen 220 illustrated in FIG. 2C.

FIG. 2D illustrates an example of the Color selection screen 230. The CPU 102 displays the Color selection screen 230 upon detection of selection of the Color selection button 212 with the operation unit 106. The Color selection screen 230 is composed of an Automatic (color-monochrome) button 231, a Full-color button 232, a Monochrome button 233, a Single-color button 234, a Two-color button 235, an Automatic (special red) button 236, a Cancel button 237, and an OK button 238.

The Automatic (color-monochrome) button 231 is set when an image of an original document scanned by the scanner 108 is printed in full-color if the image of the original document includes chromatic colors and the image of the original document is printed in monochrome if the image of the original document includes only achromatic colors, upon selection by the user. The determination here is described in detail below. The Automatic (color-monochrome) button 231 is selected by default on the Color selection screen 230.

The Full-color button 232 and the Monochrome button 233 are used to set full-color fixed printing and monochrome fixed printing, respectively, regardless of the image of the original document scanned by the scanner 108, upon selection by the user.

The Single-color button 234 is used to convert an image of an original document scanned by the scanner 108 into a specified color other than black for printing, upon selection by the user. The CPU 102 displays a Single-color settings screen 240 illustrated in FIG. 2E in the operation unit 106 upon detection of selection of the Single-color button 234 with the operation unit 106.

FIG. 2E illustrates an example of the Single-color settings screen 240. The Single-color settings screen 240 is composed of a Red button 241, a Green button 242, a Blue button 243, a Yellow button 244, a Magenta button 245, a Cyan button 246, a Cancel button 247, and an OK button 248. The color used in the single-color (one color) is accepted on the Single-color settings screen 240.

The Two-color button 235 is used to convert colors close to a specified color in an image of an original document scanned by the scanner 108 into the specified color for printing and print colors that are not close to the specified color in monochrome, upon selection by the user. For example, when the color selected on a Two-color settings screen 250 is red, colors close to red are converted into red and the other colors that are not close to red are converted into black. The CPU 102 displays the Two-color settings screen 250 illustrated in FIG. 2F upon detection of selection of the Two-color button 235 with the operation unit 106. Here, a color close to a specified color is the color specified on the Two-color settings screen 250 or the color apart from the hue of the special red specified by selecting the Automatic (special red) button 236 by a predetermined amount on a hue circle. For example, when the specified color is the special red, colors including yellow and pink are processed as the colors close to the special red and colors including green and blue are processed as the colors that are not close to the special red.

FIG. 2F illustrates an example of the Two-color settings screen 250. The Two-color settings screen 250 is composed of a Red button 251, a Green button 252, a Blue button 253, a Yellow button 254, a Magenta button 255, a Cyan button 256, a Cancel button 257, and an OK button 258. The Two-color settings screen 250 is an acceptance screen that accepts the settings of the two colors. An example is described in the first embodiment, in which the two-color printing is performed using a specified color and black. Specifically, when the Red button 251 is selected, colors close to red are converted into red and the other colors that are not close to red are converted into black for printing.

Referring back to FIG. 2D, the Automatic (special red) button 236 is used to convert colors close to the special red in an image of an original document scanned by the scanner 108 into the special red and convert colors that are not close to the special red into black for printing, upon selection by the user.

The examples are described above in which colors close to a specified color are converted into the specified color and colors that are not close to the specified color are converted into black in the two-color copy and colors close to the special red are converted into the special red and colors that are not close to the special red are converted into black in the automatic (special red). However, the first embodiment is not limited to the above ones. Chromatic colors may be converted into a specified color and achromatic colors may be converted into black in the two-color copy and chromatic colors may be converted into the special red and achromatic colors may be converted into black in the Automatic (special red). An example will now be described in which whether colors close to a specified color are converted into the specified color or chromatic colors are converted into the specified color is specified by the user.

Figure 3:
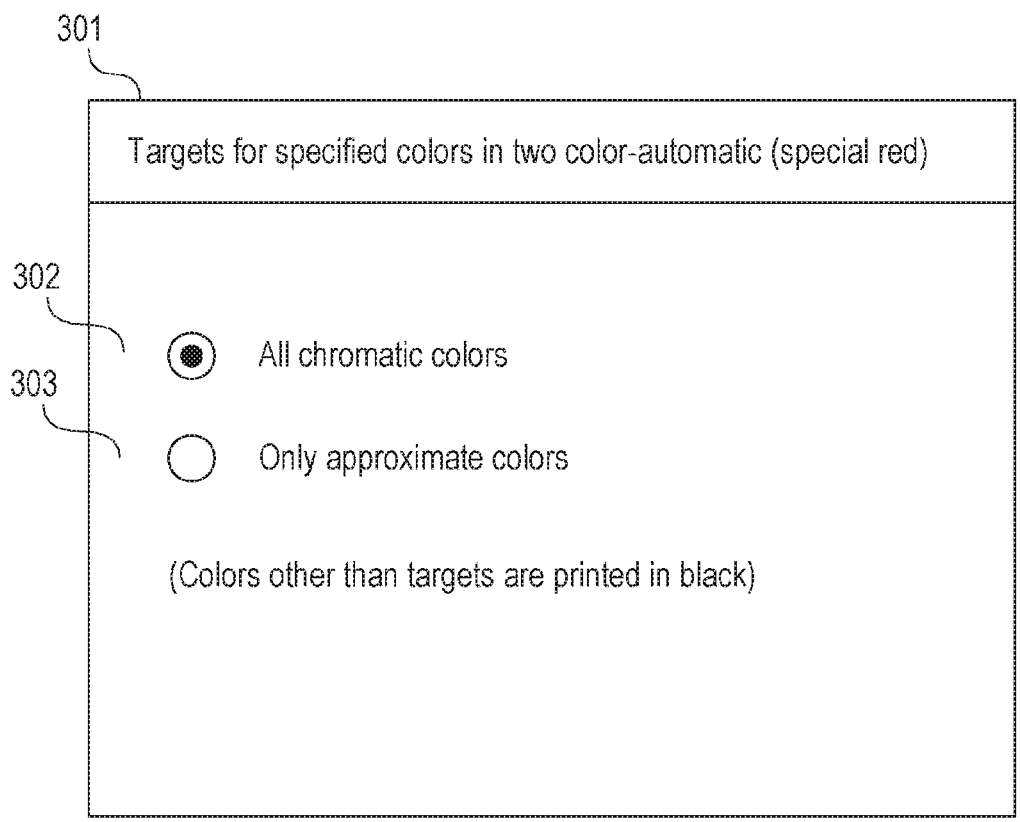
FIG. 3 illustrates an example of a settings screen.

FIG. 3 illustrates an example of a settings screen. A Settings screen 301 is a screen to accept a setting indicating which portion in an image of an original document is converted into a specified color when the two-color or the automatic (special red) is specified in the copy. The Settings screen 301 may be displayed in the operation unit 106 or may be displayed in an external PC connected to the MFP 101 via the network I/F 109.

The Settings screen 301 is composed of an "All chromatic colors" setting value 302 and an "Only approximate colors" setting value 303. When the "All chromatic colors" setting value 302 is set in the two-color or the automatic (special red), all the portions of chromatic colors in an image of an original document are converted into a specified color (including the special red). When the "Only approximate colors" setting value 303 is set in the two-color or the automatic (special red), only colors close to a specified color are converted into the specified color (including the special red) and the other colors are converted into black. An example of this will now be described with reference to FIG. 4.

Figure 4:
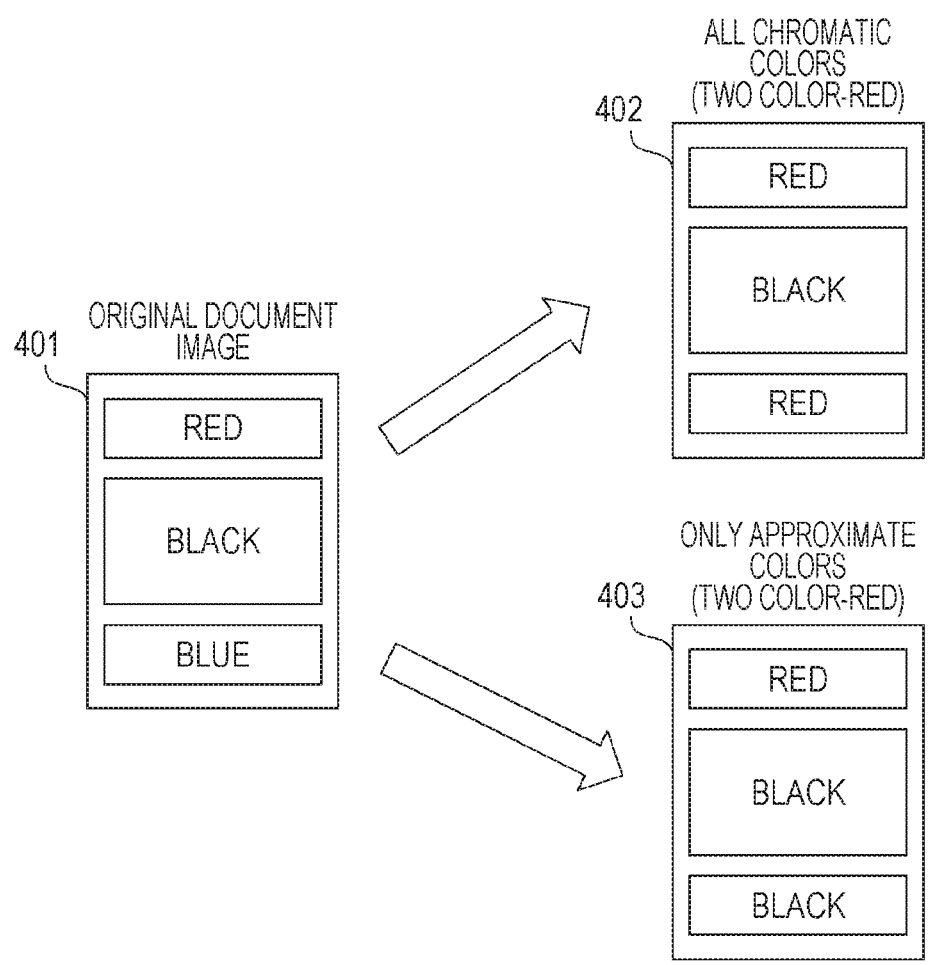
FIG. 4 illustrates an example of a printing process when a Red button is selected.

FIG. 4 illustrates an example of the printing process when the Red button 251 is selected. An image indicated by an original document 401 includes characters or images of red, black, and blue. If the "All chromatic colors" setting value 302 is set when the copy with the two color (red) specified is performed for the original document 401, determination of chromatic colors or achromatic colors is performed for each pixel to perform color conversion. A target pixel is converted into red, which is a specified color, when the target pixel has a chromatic color and the target pixel is converted into black when the target pixel has an achromatic color. As a result, as in a print 402, characters or image of red and blue are converted into red and characters or images of black are kept to black. In contrast, if the "Only approximate colors" setting value 303 is set in the above case, determination of appropriate colors is performed for each pixel to perform the color conversion. Whether each pixel has an appropriate color is determined by calculating the hue and the saturation based on color information about each pixel and determining whether the values of the hue and the saturation are within predetermined ranges. The calculation of the hue and the saturation may be performed using a common conversion formula or a unique conversion formula. In this case, the pixel within predetermined ranges of the hue and the saturation with respect to red is determined to have an appropriate color. The pixels having appropriate colors are converted into red and the pixels that do not have appropriate colors are converted into black. As a result, as in a print 403, characters or images of red are converted into red and characters or images of blue and black are converted into black. Since the two-color printing is performed in this case because the original document 401 includes characters or images of red, only black pixels may exist as the result of the color conversion if the original document 401 does not include character or image of red. In such a case, the counting-up is performed using the monochrome printing counter.

Figure 5:
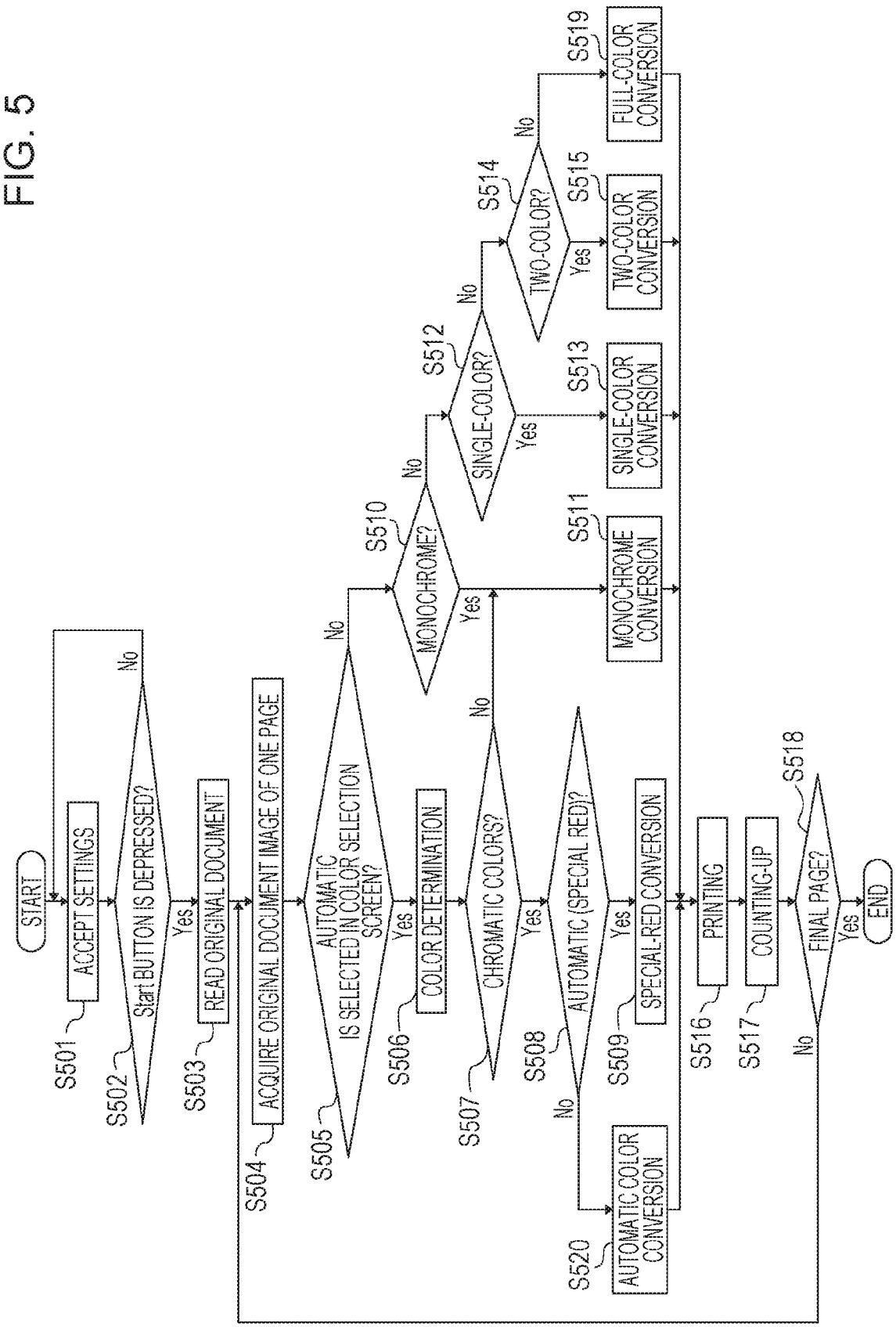
FIG. 5 is a flowchart illustrating an example of a two-color copying process to convert chromatic colors into a specified color.

FIG. 5 is a flowchart illustrating an example of a two-color copying process to convert chromatic colors into a specified color. The process in the flowchart in FIG. 5 is realized by the CPU 102, which reads out a program stored in the ROM 103 to the RAM 104 for execution. The flowchart in FIG. 5 is started upon selection of the Copy icon 201 or the Special-red copy icon 202 in a state in which the "All chromatic colors" setting value 302 is selected on the Settings screen 301.

Referring to FIG. 5, in Step S501, the CPU 102 accepts the settings of the copy function on the Copy settings screen 210 or the Special-red copy settings screen 220 displayed in the operation unit 106.

In Step S502, the CPU 102 determines whether the Start button (not illustrated) is selected. If the CPU 102 determines that the Start button is selected (YES in Step S502), the process goes to Step S503. If the CPU 102 determines otherwise (NO in Step S502), the process goes back to Step S501.

In Step S503, the CPU 102 controls the scanner 108 based on the settings accepted in Step S501 to read out an image of an original document, generates full-color image data, and stores the generated image data in the storage 105.

In Step S504, the CPU 102 acquires the image data of one page from the storage 105. Although the example is described in the first embodiment, in which the generated image data is stored in the storage 105 and an image is printed on a sheet based on the image data read out from the storage 105, the first embodiment is not limited to this. For example, the generated image data may be stored in the RAM 104 and the image data may be read out from the RAM 104 not via the storage 105 to print an image on a sheet.

In Step S505, the CPU 102 determines whether the automatic (color-monochrome) or the automatic (special red) is selected on the color selection screen. If the CPU 102 determines that the automatic (color-monochrome) or the automatic (special red) is selected (YES in Step S505), the process goes to Step S506. If the CPU 102 determines otherwise (NO in Step S505), the process goes to Step S510.

In Step S506, the CPU 102 performs color determination. The color determination is a process to determine whether the image corresponding to the acquired image data includes chromatic colors or includes only achromatic colors. Specifically, the CPU 102 determines whether the pixel data in the acquired image data, which indicates chromatic colors, is greater than or equal to a threshold value. If the CPU 102 determines that the pixel data in the acquired image data, which indicates chromatic colors, is greater than or equal to the threshold value, the CPU 102 determines that the image indicated by the image data is an image of chromatic colors. If the CPU 102 determines that the pixel data in the acquired image data, which indicates chromatic colors, is smaller than the threshold value, the CPU 102 determines that the image indicated by the image data is an image of achromatic colors.

In Step S507, the CPU 102 determines whether the image determined in Step S506 is an image of chromatic colors or an image of achromatic colors. If the CPU 102 determines that the image determined in Step S506 is an image of chromatic colors (YES in Step S507), the process goes to Step S508. If the CPU 102 determines otherwise (NO in Step S507), the process goes to Step S511.

In Step S508, the CPU 102 determines whether the automatic (special red) is selected in the color selection. If the CPU 102 determines that the automatic (special red) is selected (YES in Step S508), the process goes to Step S509. If the CPU 102 determines otherwise (NO in Step S508), the process goes to Step S520.

In Step S509, the CPU 102 converts an RGB value of the acquired image data into a CMYK value. Here, the CPU 102 performs determination of a chromatic-color pixel or an achromatic-color pixel for each pixel. The RGB value of the chromatic-color pixel is converted into the CMYK value indicating the special red. The RGB value of the achromatic-color pixel is converted into the CMYK value indicating black.

In Step S520, the CPU 102 converts the RGB value of the acquired image data into the CMYK value. Here, the CPU 102 performs the conversion so that the colors of the read-out image of the original document are represented in full color.

In Step S510, the CPU 102 determines whether the monochrome is selected in the color selection. If the CPU 102 determines that monochrome is selected (YES in Step S510), the process goes to Step S511. If the CPU 102 determines otherwise (NO in Step S510), the process goes to Step S512.

In Step S511, the CPU 102 converts the RGB value of the acquired image data into the CMYK value. Here, the CPU 102 performs the conversion into the CMYK value so that the pixels of chromatic colors and the pixels of achromatic colors are output in black.

In Step S512, the CPU 102 determines whether the single-color is selected in the color selection. If the CPU 102 determines that the single-color is selected (YES in Step S512), the process goes to Step S513. If the CPU 102 determines otherwise (NO in Step S512), the process goes to Step S514.

In Step S513, the CPU 102 converts the RGB value of the acquired image data into the CMYK value. Here, the CPU 102 performs the conversion into the CMYK value so that the pixels of chromatic colors and the pixels of achromatic colors are output in the selected single-color.

In Step S514, the CPU 102 determines whether the two-color is selected in the color selection. If the CPU 102 determines that the two-color is selected (YES in Step S514), the process goes to Step S515. If the CPU 102 determines otherwise (NO in Step S514), the process goes to Step S519.

In Step S515, the CPU 102 converts the RGB value of the acquired image data into the CMYK value. Here, the CPU 102 performs the conversion into the CMYK value so that the pixels of chromatic colors are output in the selected two colors and the pixels of achromatic colors are output in black. The density indicated by the CMYK value converted in this conversion is based on the RGB value of the acquired image data. In other words, all the portions of chromatic colors do not have the same hue and the same density and the portions of chromatic colors are represented at the density values corresponding to the colors of the acquired image data in the same hue.

In Step S519, the CPU 102 converts the RGB value of the acquired image data into the CMYK value. Here, the CPU 102 performs the conversion into the CMYK value so that the pixels of chromatic colors and the pixels of achromatic colors are output in full color.

In Step S516, the CPU 102 controls the printer 107 to print out an image on a sheet based on the CMYK value resulting from the conversion.

In Step S517, the CPU 102 counts up a billing counter based on the image printed in Step S516. Count information is stored in the EEPROM 110. This step will be described in detail below.

In Step S518, the CPU 102 determines whether the image printed in Step S516 is the image of the final page. If the CPU 102 determines that the image printed in Step S516 is the image of the final page (YES in Step S518), the two-color copying process is terminated. If the CPU 102 determines otherwise (NO in Step S518), the process goes back to Step S504.

Figure 6:
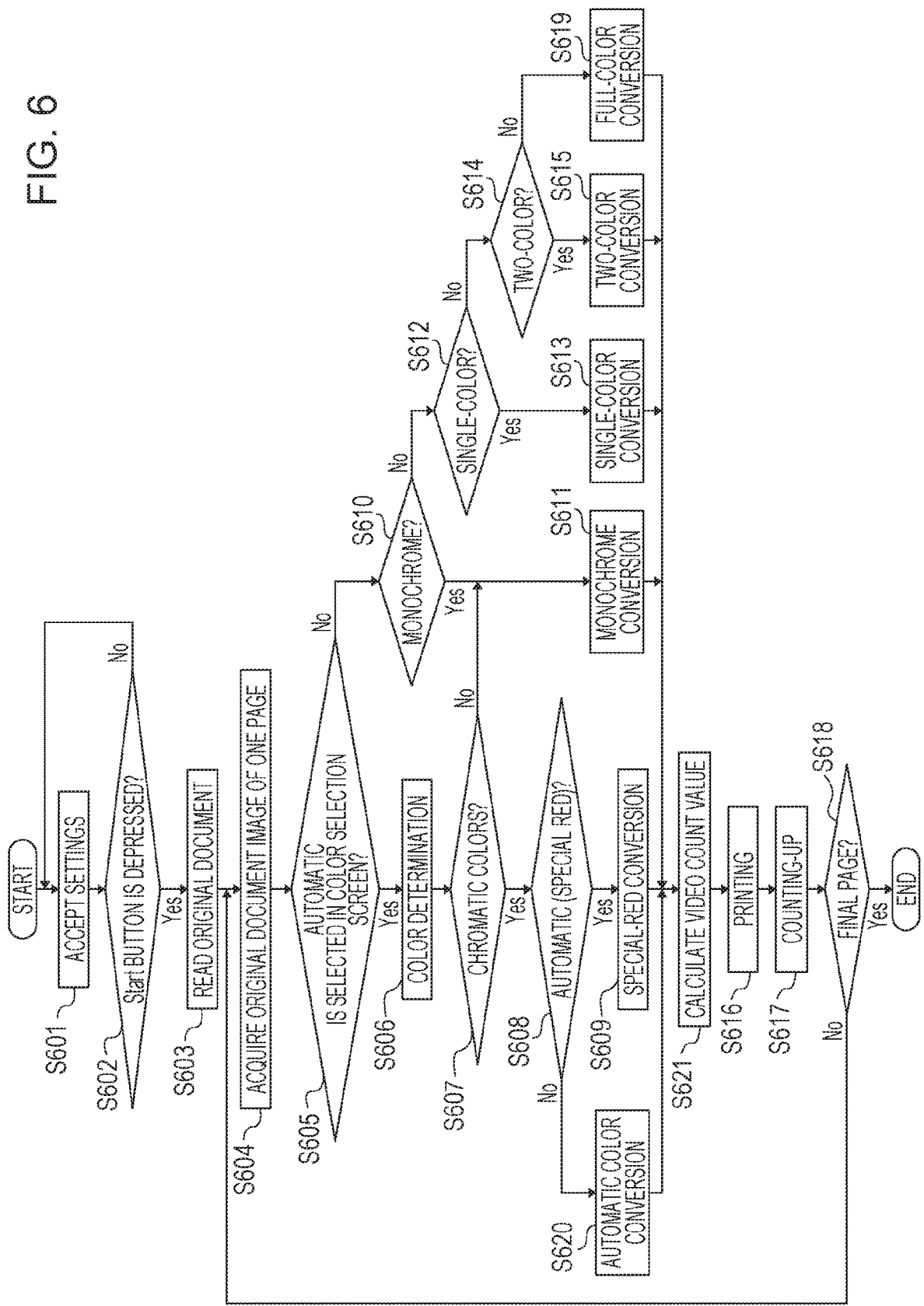
FIG. 6 is a flowchart illustrating an example of a two-color copying process to convert colors close to a specified color into the specified color (including a special red).

FIG. 6 is a flowchart illustrating an example of a two-color copying process to convert colors close to a specified color into the specified color. The process in the flowchart in FIG. 6 is realized by the CPU 102, which reads out a program stored in the ROM 103 to the RAM 104 for execution. The flowchart in FIG. 6 is started upon selection of the Copy icon 201 or the Special-red copy icon 202 in a state in which the "Only approximate colors" setting value 303 is selected on the Settings screen 301.

Referring to FIG. 6, in Step S601, the CPU 102 accepts the settings of the copy function on the Copy settings screen 210 or the Special-red copy settings screen 220 displayed in the operation unit 106.

In Step S602, the CPU 102 determines whether the Start button (not illustrated) is selected. If the CPU 102 determines that the Start button is selected (YES in Step S602), the process goes to Step S603. If the CPU 102 determines otherwise (NO in Step S602), the process goes back to Step S601.

In Step S603, the CPU 102 controls the scanner 108 based on the settings accepted in Step S601 to read out an image of an original document, generates full-color image data, and stores the generated image data in the storage 105.

In Step S604, the CPU 102 acquires the image data of one page from the storage 105. Although the example is described in the first embodiment, in which the generated image data is stored in the storage 105 and an image is printed on a sheet based on the image data read out from the storage 105, the first embodiment is not limited to this. For example, the generated image data may be stored in the RAM 104 and the image data may be read out from the RAM 104 not via the storage 105 to print an image on a sheet.

In Step S605, the CPU 102 determines whether the automatic (color-monochrome) or the automatic (special red) is selected on the color selection screen. If the CPU 102 determines that the automatic (color-monochrome) or the automatic (special red) is selected (YES in Step S605), the process goes to Step S606. If the CPU 102 determines otherwise (NO in Step S605), the process goes to Step S610.

In Step S606, the CPU 102 performs the color determination. The color determination is a process to determine whether the image corresponding to the acquired image data includes chromatic colors or includes only achromatic colors. Specifically, the CPU 102 determines whether the pixel data in the acquired image data, which indicates chromatic colors, is greater than or equal to a threshold value. If the CPU 102 determines that the pixel data in the acquired image data, which indicates chromatic colors, is greater than or equal to the threshold value, the CPU 102 determines that the image indicated by the image data is an image of chromatic colors. If the CPU 102 determines that the pixel data in the acquired image data, which indicates chromatic colors, is smaller than the threshold value, the CPU 102 determines that the image indicated by the image data is an image of achromatic colors.

In Step S607, the CPU 102 determines whether the image determined in Step S606 is an image of chromatic colors or an image of achromatic colors. If the CPU 102 determines that the image determined in Step S606 is an image of chromatic colors (YES in Step S607), the process goes to Step S608. If the CPU 102 determines otherwise (NO in Step S607), the process goes to Step S611.

In Step S608, the CPU 102 determines whether the automatic (special red) is selected in the color selection. If the CPU 102 determines that the automatic (special red) is selected (YES in Step S608), the process goes to Step S609. If the CPU 102 determines otherwise (NO in Step S608), the process goes to Step S620.

In Step S609, the CPU 102 converts the RGB value of the acquired image data into the CMYK value. Here, the CPU 102 determines whether each pixel has a color close to the special red or a color that is not close to the special red. The RGB value of the pixel having a color close to the special red is converted into the CMYK value indicating the special red. The RGB value of the pixel having a color that is not close to the special red is converted into the CMYK value indicating black.

In Step S620, the CPU 102 converts the RGB value of the acquired image data into the CMYK value. Here, the CPU 102 performs the conversion so that the colors of the read-out image of the original document are represented in full color.

In Step S610, the CPU 102 determines whether the monochrome is selected in the color selection. If the CPU 102 determines that monochrome is selected (YES in Step S610), the process goes to Step S611. If the CPU 102 determines otherwise (NO in Step S610), the process goes to Step S612.

In Step S611, the CPU 102 converts the RGB value of the acquired image data into the CMYK value. Here, the CPU 102 performs the conversion into the CMYK value so that the pixels of chromatic colors and the pixels of achromatic colors are output in black.

In Step S612, the CPU 102 determines whether the single-color is selected in the color selection. If the CPU 102 determines that the single-color is selected (YES in Step S612), the process goes to Step S613. If the CPU 102 determines otherwise (NO in Step S612), the process goes to Step S614.

In Step S613, the CPU 102 converts the RGB value of the acquired image data into the CMYK value. Here, the CPU 102 performs the conversion into the CMYK value so that the pixels of chromatic colors and the pixels of achromatic colors are output in the selected single-color.

In Step S614, the CPU 102 determines whether the two-color is selected in the color selection. If the CPU 102 determines that the two-color is selected (YES in Step S614), the process goes to Step S615. If the CPU 102 determines otherwise (NO in Step S614), the process goes to Step S619.

In Step S615, the CPU 102 converts the RGB value of the acquired image data into the CMYK value. Here, the CPU 102 performs the conversion into the CMYK value so that the pixels having colors close to the specified color are output in the specified color and the pixels having colors that are not close to the specified color are output in black. The density indicated by the CMYK value converted in this conversion is based on the RGB value of the acquired image data. In other words, all the portions having colors close to the specified color do not have the same hue and the same density and the portions having colors close to the specified color are represented at the density values corresponding to the colors of the acquired image data in the same hue.

In Step S619, the CPU 102 converts the RGB value of the acquired image data into the CMYK value. Here, the CPU 102 performs the conversion into the CMYK value so that the pixels of chromatic colors and the pixels of achromatic colors are output in full color.

In Step S621, the CPU 102 calculates a video count value of the image data subjected to the conversion and stores the calculated value in the RAM 104 or the storage 105. The video count value is calculated by adding up the pixel values of the image data for the respective toner colors of cyan (C), magenta (M), yellow (Y), and black (K). Although the video count value is indicated to the printer 107 in the printing to be used also in control of supply of toner, the video count value is also used in color mode determination of color or monochrome of the print in the first embodiment.

In Step S616, the CPU 102 controls the printer 107 to print out an image on a sheet based on the CMYK value resulting from the conversion.

In Step S617, the CPU 102 counts up the billing counter based on the image printed in Step S616. Count information is stored in the EEPROM 110. This step will be described in detail below.

In Step S618, the CPU 102 determines whether the image printed in Step S616 is the image of the final page. If the CPU 102 determines that the image printed in Step S616 is the image of the final page (YES in Step S618), the two-color copying process is terminated. If the CPU 102 determines otherwise (NO in Step S618), the process goes back to Step S604.

FIG. 7 illustrates an example of a counter calculation table 700. The number-of-sheets counters, which perform the counting-up in Step S517 and Step S617, and display counters for display for the user are described with reference to FIG. 7. The number-of-sheets counters including a full-color large number-of-sheets counter 703, a full-color small number-of-sheets counter 704, a monochrome large number-of-sheets counter 705, a monochrome small number-of-sheets counter 706, a single-color large number-of-sheets counter 707, and a single-color small number-of-sheets counter 708 are held in the EEPROM 110. The large size indicates prints the length in a sub-scanning direction of which is longer than or equal to 364 mm. The small size indicates prints the length in the sub-scanning direction of which is shorter than 364 mm.

Each display counter 702 is used by, for example, the operation unit 106 to calculate a display count. A counter identifier (ID) 701 for uniquely identifying each display counter 702 is allocated to the display counter 702. The relationship between the counter IDs 701 and the display counters 702 is indicated in the counter calculation table 700. A method of calculating the display counters from the number-of-sheets counters 703 to 708 will now be described. Total 1 having the counter ID of 101 is the display counter that counts the number of sheets as one regardless of the size of the print. Accordingly, the respective number-of-sheets counters 703 to 708 are multiplied by one to add up the display counter. Total 2 having the counter ID of 102 is the display counter that counts the number of sheets of the large sizes as two and counts the number of sheets of the small sizes as one. Accordingly, the large-size number-of-sheets counters 703, 705, and 707 are multiplied by two and the small-size number-of-sheets counters 704, 706, and 708 are multiplied by one to add up the display counter. Full-color 1 having the counter ID of 103 is the display counter that counts the number of sheets as one for the full-color regardless of the size of the print. Accordingly, the number-of-sheets counters 703 and 704 are multiplied by one to add up the display counter. Since the other number-of-sheets counters are multiplied by zero, the other number-of-sheets counters are not the targets for counting. Similar calculation is performed for Full-color 2 and the subsequent display counters. The coefficients by which the respective number-of-sheets counters are multiplied in the calculation of the respective display counters are held in the calculation table 700 in the above manner.

Figure 8:
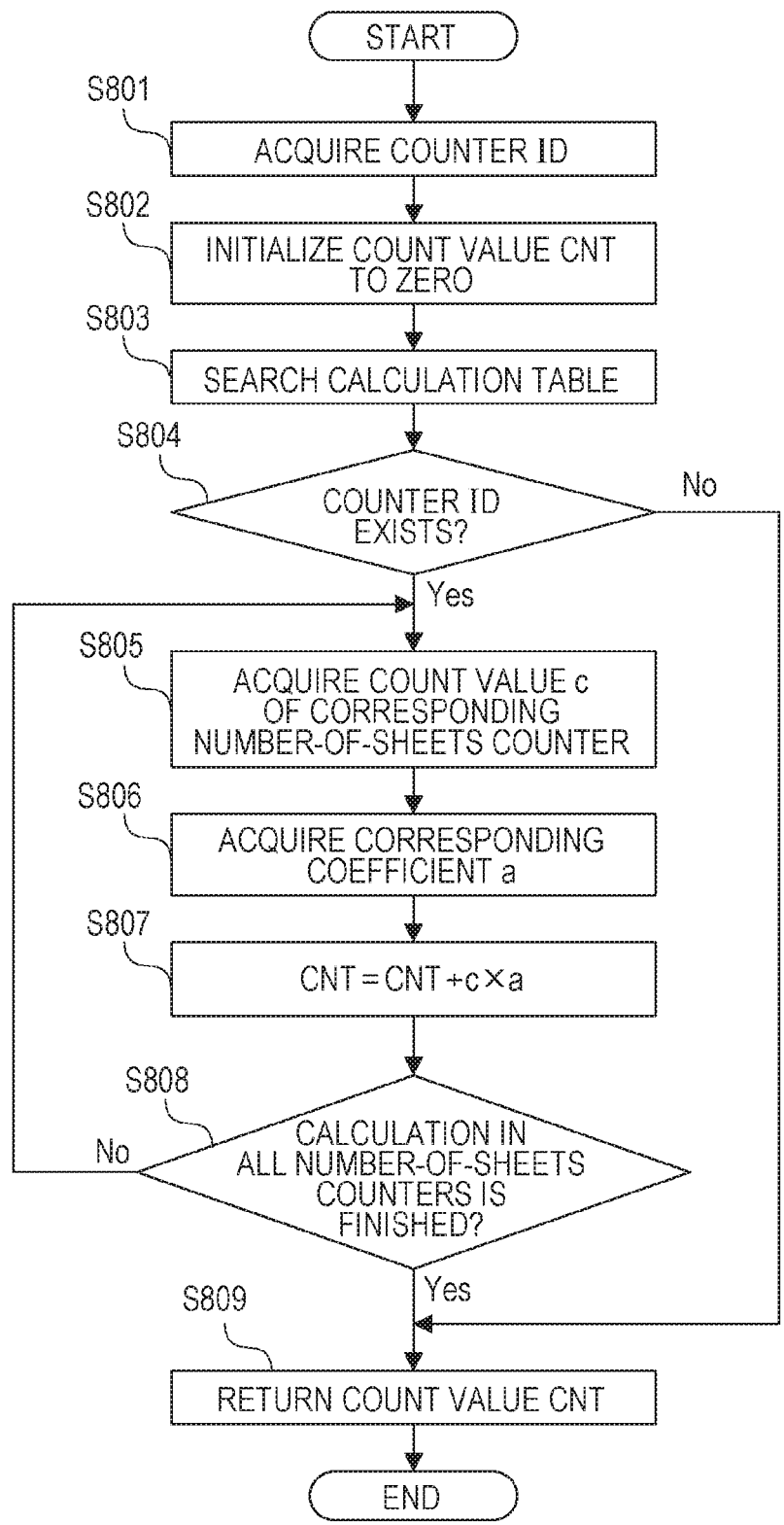
FIG. 8 is a flowchart illustrating an example of a calculating process of a display counter.

FIG. 8 is a flowchart illustrating an example of a calculating process of the display counter. The process in the flowchart in FIG. 8 is realized by the CPU 102, which reads out a program stored in the ROM 103 to the RAM 104 for execution. The flowchart in FIG. 8 is started upon completion of Step S1014 or Step S1015 in FIG. 10, Step S1114 or Step S1115 in FIG. 11, or Step S1313 or Step S1314 in FIG. 13, described below.

Referring to FIG. 8, in Step S801, the CPU 102 acquires the counter ID. In Step S802, the CPU 102 assigns zero to a count value CNT for adding up the display counter to initialize the count value CNT to zero. In Step S803, the CPU 102 searches the calculation table.

In Step S804, the CPU 102 determines whether the counter ID acquired in Step S801 exists in the calculation table 700. If the CPU 102 determines that the counter ID acquired in Step S801 exists in the calculation table 700 (YES in Step S804), the process goes to Step S805. If the CPU 102 determines otherwise (NO in Step S804), the process goes to Step S809. In Step S809, the CPU 102 determines that a request to acquire an illegal counter ID is submitted and returns CNT=0.

In Step S805, the CPU 102 acquires a count value c of the corresponding number-of-sheets counter. Specifically, the count value c indicates the value of the number-of-sheets counter, such as the full-color large number-of-sheets counter 703, the full-color small number-of-sheets counter 704, the monochrome large number-of-sheets counter 705, the monochrome small number-of-sheets counter 706, the single-color large number-of-sheets counter 707, or the single-color small number-of-sheets counter 708, which are held in the non-volatile memory of the EEPROM 110.

In Step S806, the CPU 102 acquires a coefficient a corresponding to the corresponding number-of-sheets counter from the calculation table 700. For example, the coefficient a of the full-color large number-of-sheets counter 703 for the counter ID of 101 is one.

In Step S807, the CPU 102 adds a value of c×a to the count value CNT.

In Step S808, the CPU 102 determines whether calculation of all the number-of-sheets counters is finished. If the CPU 102 determines that calculation of all the number-of-sheets counters is finished (YES in Step S808), the process goes to Step S809. If the CPU 102 determines otherwise (NO in Step S808), the process goes back to Step S805.

In Step S809, the CPU 102 returns the count value CNT that is added up as the value of the display counter.

Figure 9:
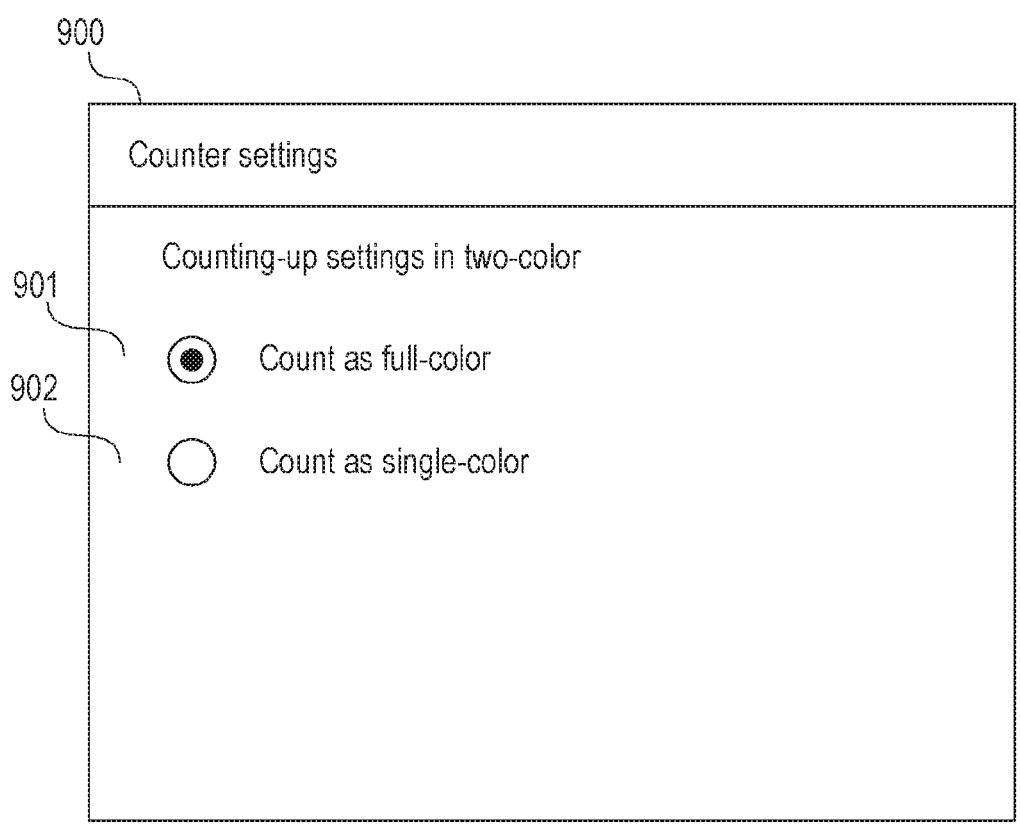
FIG. 9 illustrates an example of a counter settings screen.

FIG. 9 illustrates an example of a counter settings screen. A Counter settings screen 900 in FIG. 9 is displayed when a service man sets the MFP 101 to a service mode. The Counter settings screen 900 may be displayed when a system manager of the MFP 101 or a user having an administrator right has logged into the MFP 101, not by the service man.

A Count as full-color button 901 and a Count as single-color button 902, which are used when an image determined to include chromatic colors is printed or when an image determined to include colors close to a specified color is printed, are displayed on the Counter settings screen 900. The setting of either of the Count as full-color button 901 and the Count as single-color button 902 is enabled in response to the button selected by the service man.

The number of used colors in the two-color is smaller than that in the full-color and the amount of black in the two-color is greater than that in the single-color. Accordingly, flexible setting by the user is enabled by selecting the full-color or the single-color as the counting-up setting in the two-color depending on the operation.

Figure 10:
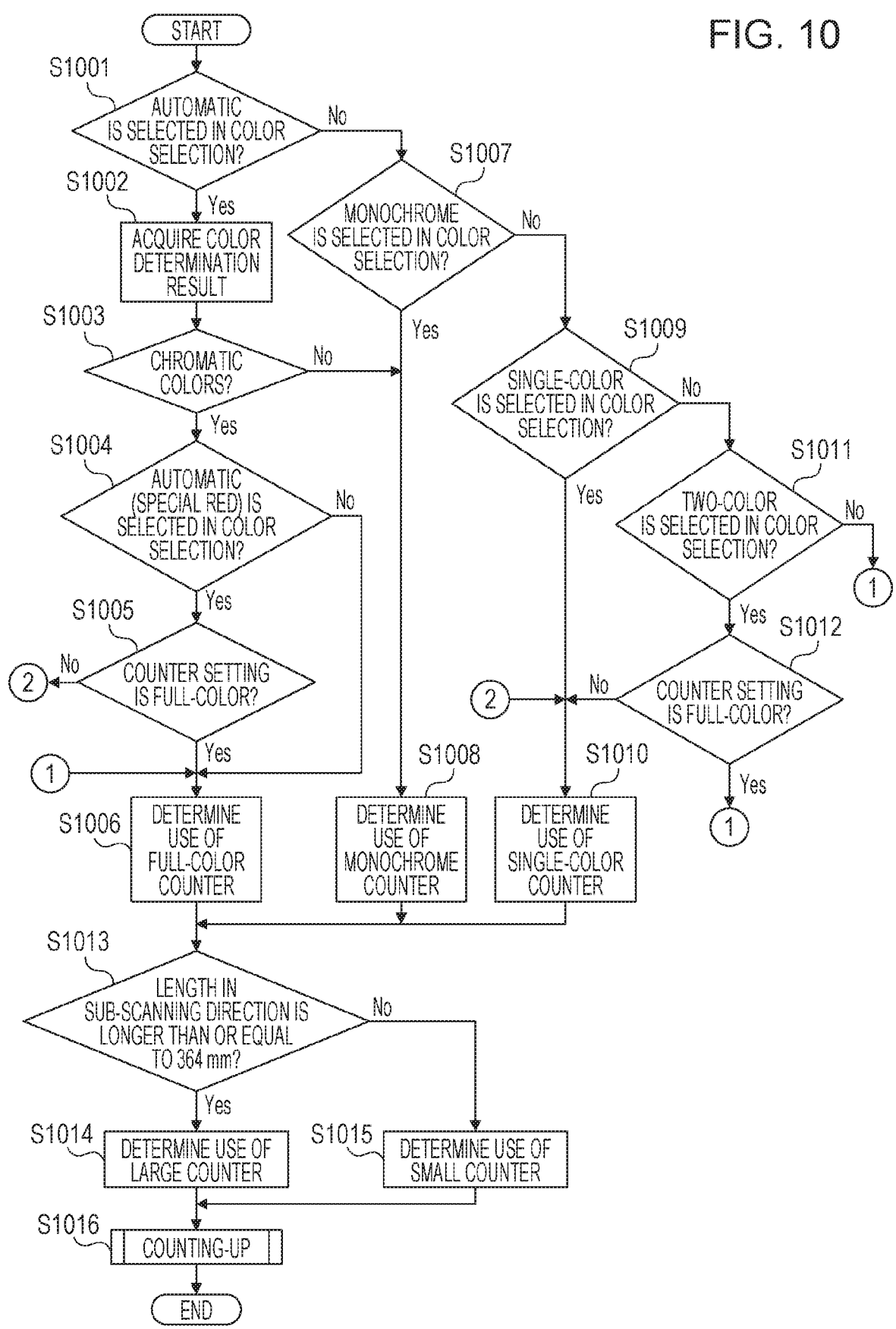
FIG. 10 is a flowchart illustrating an example of a counting-up process in the two-color copying process to convert chromatic colors into a specified color.

FIG. 10 is a flowchart illustrating an example of a counting-up process in the two-color copying process to convert chromatic colors into a specified color. The flowchart in FIG. 10 is realized by the CPU 102, which reads out a program stored in the ROM 103 to the RAM 104 for execution. The flowchart in FIG. 10 is started in response to the printing in Step S516.

Referring to FIG. 10, in Step S1001, the CPU 102 determines whether the automatic (color-monochrome) or the automatic (special red) is selected in the color selection on the Copy settings screen 210 or the Special-red copy settings screen 220. If the CPU 102 determines that the Copy settings or the Automatic (color-monochrome) or the Automatic (special red) is selected (YES in Step S1001), the process goes to Step S1002. If the CPU 102 determines otherwise (NO in Step S1001), the process goes to Step S1007.

In Step S1002, the CPU 102 acquires the result of the color determination performed in Step S506.

In Step S1003, the CPU 102 determines whether the acquired determination result indicates the image of chromatic colors. If the CPU 102 determines that the acquired determination result indicates the image of chromatic colors (YES in Step S1003), the process goes to Step S1004. If the CPU 102 determines otherwise (NO in Step S1003), the process goes to Step S1008.

In Step S1004, the CPU 102 determines whether the automatic (special red) is selected in the color selection on the Copy settings screen 210 or the Special-red copy settings screen 220. If the CPU 102 determines that the automatic (special red) is selected (YES in Step S1004), the process goes to Step S1005. If the CPU 102 determines otherwise (NO in Step S1004), the process goes to Step S1006.

In Step S1005, the CPU 102 determines whether the Count as full-color is set on the Counter settings screen 900. If the CPU 102 determines that the Count as full-color is set (YES in Step S1005), the process goes to Step S1006. If the CPU 102 determines otherwise (NO in Step S1005), the process goes to Step S1010.

In Step S1006, the CPU 102 performs the counting-up using the full-color number-of-sheets counter.

In Step S1007, the CPU 102 determines whether the monochrome is selected in the color selection on the Copy settings screen 210 or the Special-red copy settings screen 220. If the CPU 102 determines that the monochrome is selected (YES in Step S1007), the process goes to Step S1008. If the CPU 102 determines otherwise (NO in Step S1007), the process goes to Step S1009.

In Step S1008, the CPU 102 performs the counting-up using the monochrome number-of-sheets counter.

In Step S1009, the CPU 102 determines whether the single-color is selected in the color selection on the Copy settings screen 210 or the Special-red copy settings screen 220. If the CPU 102 determines that the single-color is selected (YES in Step S1009), the process goes to Step S1010. If the CPU 102 determines otherwise (NO in Step S1009), the process goes to Step S1011.

In Step S1010, the CPU 102 performs the counting-up using the single-color number-of-sheets counter.

In Step S1011, the CPU 102 determines whether the two-color is selected in the color selection on the Copy settings screen 210 or the Special-red copy settings screen 220. If the CPU 102 determines that the two-color is selected (YES in Step S1011), the process goes to Step S1012. If the CPU 102 determines otherwise (NO in Step S1011), the process goes to Step S1006.

In Step S1012, the CPU 102 determines whether the Count as full-color is set on the Counter settings screen 900. If the CPU 102 determines that the Count as full-color is set (YES in Step S1012), the process goes to Step S1006. If the CPU 102 determines otherwise (NO in Step S1012), the process goes to Step S1010.

In Step S1013, the CPU 102 determines whether the length in the sub-scanning direction of the print is longer than or equal to 364 mm. If the CPU 102 determines that the length in the sub-scanning direction of the print is longer than or equal to 364 mm (YES in Step S1013), the process goes to Step S1014. If the CPU 102 determines otherwise (NO in Step S1013), the process goes to Step S1015.

In Step S1014, the CPU 102 determines that the counting-up is performed using the large number-of-sheets counter. In Step S1015, the CPU 102 determines that the counting-up is performed using the small number-of-sheets counter.

In Step S1016, the CPU 102 performs the counting-up. Specifically, the CPU 102 uses information in the determined number-of-sheets counter to perform the flowchart in FIG. 8.

Figure 11:
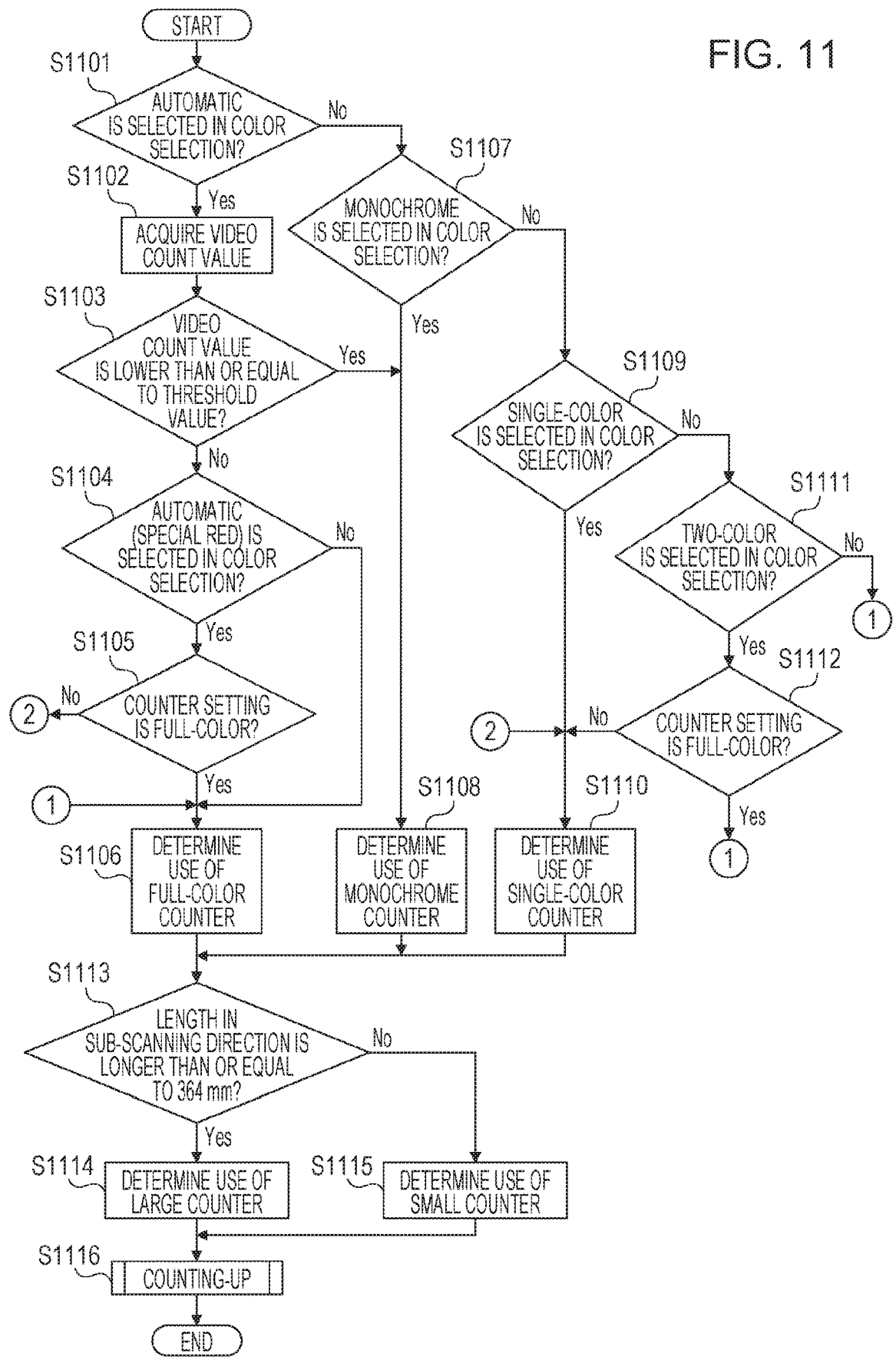
FIG. 11 is a flowchart illustrating an example of a counting-up process in the two-color copying process to convert colors close to a specified color into the specified color (including the special red).

FIG. 11 is a flowchart illustrating an example of a counting-up process in the two-color copying process to convert colors close to a specified color into the specified color (including the special red). The flowchart in FIG. 11 is realized by the CPU 102, which reads out a program stored in the ROM 103 to the RAM 104 for execution. The flowchart in FIG. 11 is started in response to the printing in Step S616.

Referring to FIG. 11, in Step S1101, the CPU 102 determines whether the automatic (color-monochrome) or the automatic (special red) is selected in the color selection on the Copy settings screen 210 or the Special-red copy settings screen 220. If the CPU 102 determines that the Copy settings or the Automatic (color-monochrome) or the Automatic (special red) is selected (YES in Step S1101), the process goes to Step S1102. If the CPU 102 determines otherwise (NO in Step S1001), the process goes to Step S1107.

In Step S1102, the CPU 102 acquires the result of the calculation of the video count value in Step S621.

In Step S1103, the CPU 102 determines whether the video count value is lower than or equal to a threshold value. If the CPU 102 determines that the video count value is lower than or equal to the threshold value (YES in Step S1103), the process goes to Step S1108. If the CPU 102 determines otherwise (NO in Step S1103), the process goes to Step S1104. Specifically, the CPU 102 determines whether the CMY value in the video count value is lower than or equal to the threshold value. For example, as the result of the conversion in Step S609, the image that does not include a specified color (the special red) is output in monochrome and the CMY video count value is zero. However, the CMY components may remain in only a small part of the image also in this case. Accordingly, the portions having the CMY values in the video count value, which is lower than or equal to the threshold value, are determined to be output in monochrome.

In Step S1104, the CPU 102 determines whether the automatic (special red) is selected in the color selection on the Copy settings screen 210 or the Special-red copy settings screen 220. If the CPU 102 determines that the automatic (special red) is selected (YES in Step S1104), the process goes to Step S1105. If the CPU 102 determines otherwise (NO in Step S1104), the process goes to Step S1106.

In Step S1105, the CPU 102 determines whether the Count as full-color is set on the Counter settings screen 900. If the CPU 102 determines that the Count as full-color is set (YES in Step S1105), the process goes to Step S1106. If the CPU 102 determines otherwise (NO in Step S1105), the process goes to Step S1110.

In Step S1106, the CPU 102 performs the counting-up using the full-color number-of-sheets counter.

In Step S1107, the CPU 102 determines whether the monochrome is selected in the color selection on the Copy settings screen 210 or the Special-red copy settings screen 220. If the CPU 102 determines that the monochrome is selected (YES in Step S1107), the process goes to Step S1108. If the CPU 102 determines otherwise (NO in Step S1107), the process goes to Step S1109.

In Step S1108, the CPU 102 performs the counting-up using the monochrome number-of-sheets counter.

In Step S1109, the CPU 102 determines whether the single-color is selected in the color selection on the Copy settings screen 210 or the Special-red copy settings screen 220. If the CPU 102 determines that the single-color is selected (YES in Step S1109), the process goes to Step S1110. If the CPU 102 determines otherwise (NO in Step S1109), the process goes to Step S1111.

In Step S1110, the CPU 102 performs the counting-up using the single-color number-of-sheets counter.

In Step S1111, the CPU 102 determines whether the two-color is selected in the color selection on the Copy settings screen 210 or the Special-red copy settings screen 220. If the CPU 102 determines that the two-color is selected (YES in Step S1111), the process goes to Step S1112. If the CPU 102 determines otherwise (NO in Step S1111), the process goes to Step S1106.

In Step S1112, the CPU 102 determines whether the Count as full-color is set on the Counter settings screen 900. If the CPU 102 determines that the Count as full-color is set (YES in Step S1112), the process goes to Step S1106. If the CPU 102 determines otherwise (NO in Step S1112), the process goes to Step S1110.

In Step S1113, the CPU 102 determines whether the length in the sub-scanning direction of the print is longer than or equal to 364 mm. If the CPU 102 determines that the length in the sub-scanning direction of the print is longer than or equal to 364 mm (YES in Step S1113), the process goes to Step S1114. If the CPU 102 determines otherwise (NO in Step S1113), the process goes to Step S1115.

In Step S1114, the CPU 102 determines that the counting-up is performed using the large number-of-sheets counter. In Step S1115, the CPU 102 determines that the counting-up is performed using the small number-of-sheets counter.

In Step S1116, the CPU 102 performs the counting-up. Specifically, the CPU 102 uses information in the determined number-of-sheets counter to perform the flowchart in FIG. 8.

Performing the above process enables the counting appropriate for the two-color printing to be performed.

Although the example is described in the first embodiment, in which whether the number of prints is counted in color or in monochrome based on the video count value of the image printed through the printing process, the first embodiment is not limited to this. For example, it may be determined whether the number of prints is counted in color or in monochrome at the time when the image data for the printing is generated.

Second Embodiment

The method of counting up the billing count of the two-color using the full-color number-of-sheets counter or the single-color number-of-sheets counter is described in the first embodiment. An example is described in a second embodiment, in which the counting-up is performed using the number-of-sheets counters only for the two-color, focusing on the difference from the method in the first embodiment.

FIG. 12 illustrates an example of a counter calculation table 1200. A counter ID 1201, a display counter 1202, and number-of-sheets counters 1203 to 1208 are the same as the counter ID 701, the display counter 702, and the number-of-sheets counters 703 to 708 in FIG. 7.

A two-color lager number-of-sheets counter 1209 and a two-color small number-of-sheets counter 1210 are added in the calculation table 1200. In addition, counter IDs "109" and "110" are also added as the counter IDs only for the two-color. The method of calculating the display counter is the same as in the first embodiment.

Figure 13:
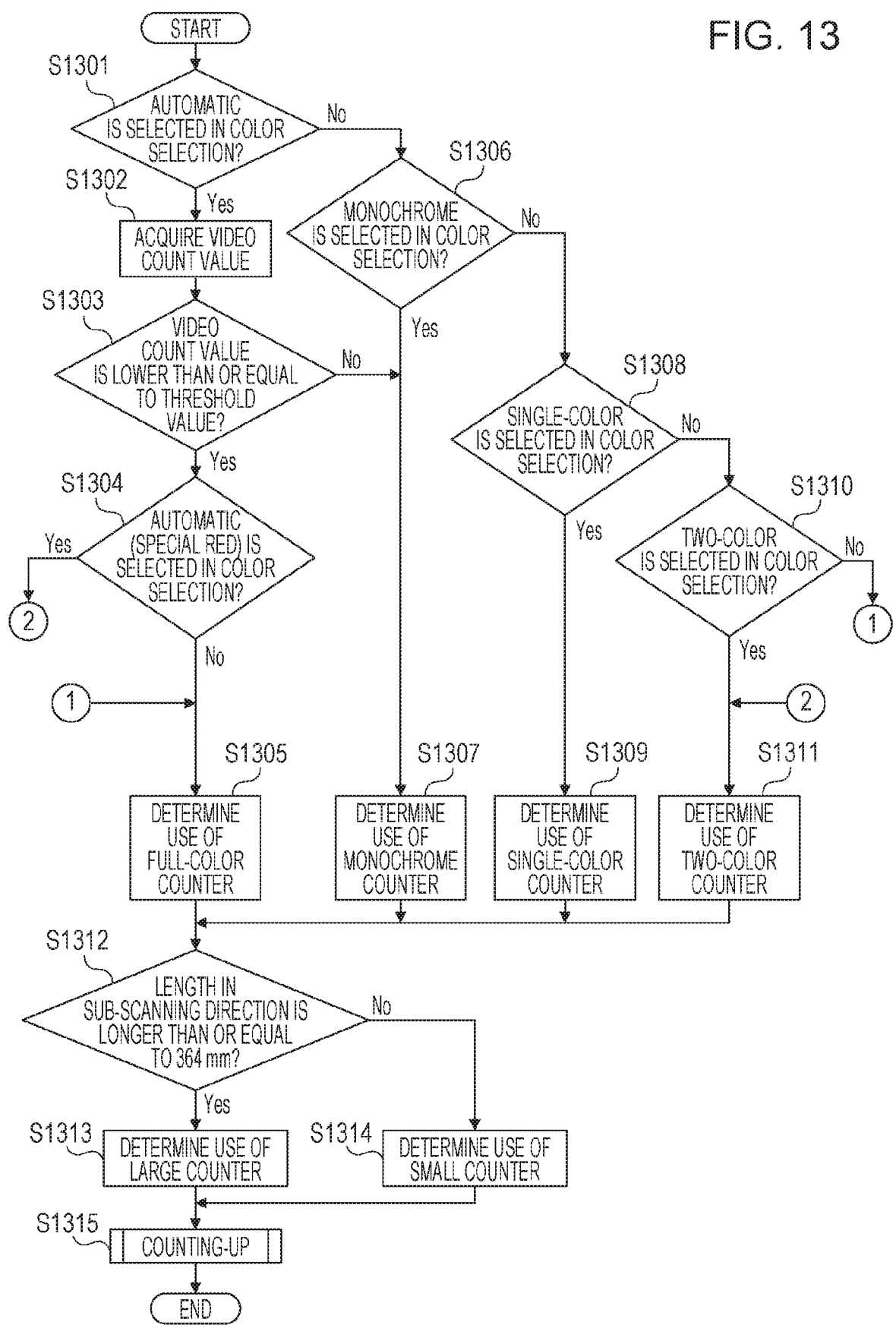
FIG. 13 is a flowchart illustrating an example of a counting-up process.

FIG. 13 is a flowchart illustrating an example of a counting-up process. The flowchart in FIG. 13 is realized by the CPU 102, which reads out a program stored in the ROM 103 to the RAM 104 for execution. The flowchart in FIG. 13 is started in response to the printing in Step S616.

The example is described in the first embodiment, in which switching between the full-color and the single-color is performed based on the setting on the Counter settings screen 900. The number-of-sheets counters only for the two-color are provided in the second embodiment. Accordingly, if the CPU 102 determines in Step S1304 that the automatic (special red) is selected in the color selection (YES in Step S1304), the process goes to Step S1311. In Step S1311, the CPU 102 performs the counting-up using the two-color number-of-sheets counter.

Also if the CPU 102 determines in Step S1310 that the two-color is selected in the color selection (YES in Step S1310), the process goes to Step S1311. In Step S1311, the CPU 102 performs the counting-up using the two-color number-of-sheets counter. The other steps are the same as those in the process in FIG. 11.

Performing the above process enables the counting appropriate for the two-color printing to be performed in the two-color printing using an amount of toner smaller than that in the full-color printing. Although the process in the two-color copy is described in the second embodiment, the second embodiment is not limited to this. For example, the above process may be performed in the two-color print function to receive a print job from a PC and perform the printing. In this case, the print job is received from the PC (not illustrated) via a local area network (LAN) (not illustrated) connected to the network I/F 109. At this time, the user is capable of specifying the two-color printing of the print job by operating the PC.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068837, filed on Mar. 29, 2019, and Japanese Patent Application No. 2019-191578, filed on Oct. 18, 2019, which are hereby incorporated by reference herein in their entirety.

What is claimed is:

1. An image processing apparatus comprising:
a scanner that scans an image;
a controller that determines whether the scanned image is an achromatic-color image or a chromatic-color image;
a printer that prints the image on a sheet; and
a user interface that receives a setting for printing a chromatic-color image included in the image in a predetermined chromatic color and for printing an achromatic-color image included in the image in black,
wherein, after the printer prints the image on the sheet based on the setting received by the user interface, the image processing apparatus counts a number of color printed sheets or a number of monochrome printed sheets based on a result of determination by the controller.

2. The image processing apparatus according to claim 1, wherein the number of color printed sheets includes a number of sheets printed in full color and a number of sheets printed in single color.

3. The image processing apparatus according to claim 1, wherein, when the printer prints the image on the sheet based on the setting received by the user interface, in a case where the scanned image is determined as the chromatic-color image by the controller, the image processing apparatus counts the number of color printed sheets, and
wherein, when the printer prints the image on the sheet based on the setting received by the user interface, in a case where the scanned image is determined as the achromatic-color image by the controller, the image processing apparatus counts the number of monochrome printed sheets.

4. The apparatus according to claim 1, wherein the number of color printed sheets is a number of sheets printed in full color.

5. The image processing apparatus according to claim 1, wherein the number of color printed sheets is a number of sheets printed in single color.

6. The image processing apparatus according to claim 1, wherein the controller determines that the scanned image is the chromatic-color image in a case where the image has pixels that indicate chromatic colors and that are greater than or equal to a threshold value, and
wherein the controller determines that the scanned image is the achromatic-color image in a case where the image has pixels that indicate chromatic colors and that are smaller than the threshold value.

7. A method of controlling an image processing apparatus, the method comprising:
scanning an image;
determining whether the scanned image is an achromatic-color image or a chromatic-color image;
printing the image on a sheet;
receiving a setting for printing a chromatic-color image included in the image into a predetermined chromatic color and for printing an achromatic-color image included in the image in black; and
counting, by the image processing apparatus, a number of color printed sheets or a number of monochrome printed sheets based on a result of the determination after the printer prints the image on the sheet based on the setting.

8. A non-transitory computer-readable storage medium storing a program that, when executed by a computer, causes the computer to perform a method of controlling an image processing apparatus, the method comprising:
scanning an image;
determining whether the scanned image is an achromatic-color image or a chromatic-color image;
printing the image on a sheet;
receiving a setting for printing a chromatic-color image included in the image in a predetermined chromatic color and for printing an achromatic-color image included in the image in black; and counting, by the image processing apparatus, a number of color printed sheets or a number of monochrome printed sheets based on a result of the determination after the printer prints the image on the sheet based on the setting.

9. An image processing apparatus comprising:

a scanner that scans an image;

a controller that determines whether the scanned image is an achromatic- color image or a chromatic-color image;

a printer that prints the image on a sheet; and a user interface that receives a setting for printing a chromatic-color image included in the image with only one chromatic-color recording material and for printing an achromatic-color image included in the image with only black recording material, wherein, after the printer prints the image on the sheet based on the setting received by the user interface, the image processing apparatus counts a number of color printed sheets or a number of monochrome printed sheets based on a result of determination by the controller.

10. The image processing apparatus according to claim 9, wherein the number of color printed sheets includes a number of sheets printed in full color and a number of sheets printed in single color.

11. The image processing apparatus according to claim 9, wherein, when the printer prints the image on the sheet based on the setting received by the user interface, in a case where the scanned image is determined as the chromatic-color image by the controller, the image processing apparatus counts the number of color printed sheets, and wherein, when the printer prints the image on the sheet based on the setting received by the user interface, in a case where the scanned image is determined as the achromatic-color image by the controller, the image processing apparatus counts the number of monochrome printed sheets.

12. The apparatus according to claim 9, wherein the number of color printed sheets is a number of sheets printed in full color.

13. The image processing apparatus according to claim 9, wherein the number of color printed sheets is a number of sheets printed in single color.

14. The image processing apparatus according to claim 9, wherein the controller determines that the scanned image is the chromatic-color image in a case where the image has pixels that indicate chromatic colors and that are greater than or equal to a threshold value, and wherein the controller determines that the scanned image is the achromatic-color image in a case where the image has pixels that indicate chromatic colors and that are smaller than the threshold value.

15. A method of controlling an image processing apparatus, the method comprising:

scanning an image;

determining whether the scanned image is an achromatic-color image or a chromatic-color image;

printing the image on a sheet;

receiving setting for printing a chromatic-color included in the image with only one chromatic-color recording material and for printing an achromatic-color image included in the image with only black recording material; and counting, by the image processing apparatus, a number of color printed sheets or a number of monochrome printed sheets based on a result of the determination after the printer prints the image on the sheet based on the setting.

16. A non-transitory computer-readable storage medium storing a program that, when executed by a computer, causes the computer to perform a method of controlling an image processing apparatus, the method comprising:

scanning an image;

determining whether the scanned image is an achromatic-color image or a chromatic-color image;

printing the image on a sheet;

receiving a setting for printing a chromatic-color image included in the image with only one chromatic-color recording material and for printing an achromatic-color image included in the image with only black recording material; and counting, by the image processing apparatus, a number of color printed sheets or a number of monochrome printed sheets based on a result of the determination after the printer prints the image on the sheet based on the setting.

17. An image processing apparatus comprising:

a scanner that scans an image;

a controller that determines whether the scanned image is an achromatic-color image or a chromatic-color image;

a printer that prints the image on a sheet; and a user interface that receives a setting for printing a chromatic-color image included in the image in a predetermined chromatic color and for printing an achromatic-color image included in the image in black, wherein, after the printer prints the image on the sheet based on the setting received by the user interface, the image processing apparatus counts a number of sheets on which the printer prints the image determined to be the achromatic-color image as a number of monochrome printed sheets.

18. An image processing apparatus comprising:

a scanner that scans an image;

a controller that determines whether the scanned image is an achromatic- color image or a chromatic-color image;

a printer that prints the image on a sheet; and a user interface that receives a setting for printing a chromatic-color image included in the image with only one chromatic-color recording material and for printing an achromatic-color image included in the image with only black recording material, wherein, after the printer prints the image on the sheet based on the setting received by the user interface, the image processing apparatus counts a number of sheets on which the printer prints the image determined to be the achromatic-color image as a number of monochrome printed sheets.

* * * * *